United States Patent
Howard

(10) Patent No.: US 8,768,301 B2
(45) Date of Patent: Jul. 1, 2014

(54) FEMTOCELL LOCATION

(75) Inventor: Peter Howard, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 1385 days.

(21) Appl. No.: 12/316,118

(22) Filed: Dec. 9, 2008

(65) Prior Publication Data
US 2009/0149194 A1 Jun. 11, 2009

(30) Foreign Application Priority Data
Dec. 10, 2007 (GB) .................................. 0724063.3

(51) Int. Cl.
H04M 1/66 (2006.01)
H04W 24/00 (2009.01)
H04W 4/00 (2009.01)

(52) U.S. Cl.
USPC .................... 455/410; 370/338; 455/456.1

(58) Field of Classification Search
USPC ......................................................... 455/410
See application file for complete search history.

(56) References Cited

U.S. PATENT DOCUMENTS

| 5,953,652 | A * | 9/1999 | Amin et al. ................... 455/410 |
| 5,978,669 | A * | 11/1999 | Sanmugam ................... 455/410 |
| 6,330,446 | B1 * | 12/2001 | Mori ........................... 455/435.2 |
| 6,466,777 | B1 * | 10/2002 | Urita .............................. 455/410 |
| 7,380,268 | B2 * | 5/2008 | Challener et al. ................. 726/2 |
| 2003/0083076 | A1 * | 5/2003 | Pradhan et al. ............... 455/456 |
| 2005/0020219 | A1 * | 1/2005 | Sih et al. ........................ 455/130 |
| 2006/0187028 | A1 * | 8/2006 | Kiang et al. ............. 340/539.13 |
| 2007/0021122 | A1 * | 1/2007 | Lane et al. ..................... 455/441 |
| 2007/0073630 | A1 * | 3/2007 | Greene et al. ..................... 705/80 |
| 2008/0010678 | A1 * | 1/2008 | Burdette et al. ................. 726/15 |
| 2008/0085699 | A1 * | 4/2008 | Hirano et al. ............... 455/414.2 |
| 2008/0176583 | A1 * | 7/2008 | Brachet et al. ............. 455/456.3 |
| 2009/0075678 | A1 * | 3/2009 | Ogoro ........................ 455/456.6 |
| 2009/0154371 | A1 * | 6/2009 | Alizadeh-Shabdiz et al. ............................. 370/252 |

FOREIGN PATENT DOCUMENTS

| EP | 1 763 178 A2 | 3/2007 |
| WO | WO 2004/040938 A1 | 5/2004 |
| WO | WO 2008/047140 A1 | 4/2008 |

* cited by examiner

*Primary Examiner* — Shaq Taha
(74) *Attorney, Agent, or Firm* — Murihead and Saturnelli, LLC

(57) ABSTRACT

In a telecommunications network a technique of identifying unauthorised movement of an Access Point, also often described as a micro base station or a femto-cell, uses a velocity check to determine if the Access Point has been moved from its intended location to a remote, unauthorised location. In an embodiment, the system described herein determines the cell ID of the cell used before the access point was used and/or after the access point is used. The differences in location between the cell IDs and the expected location of the Access Point is then determined to see if the Access Point is in its correct position.

18 Claims, 3 Drawing Sheets

FEMTOCELL LOCATION

TECHNICAL FIELD

This application relates to a telecommunications network including an access point and, more particularly, to a technique and an arrangement for identifying movement of an access point between locations and to an arrangement and method for verifying the location of an access point in a mobile telecommunications network.

BACKGROUND

There have recently been proposals to allow access to the features and services provided by cellular networks, such as GSM, 3G/UMTS, CDMA2000 and WiMax networks, other than by accessing those networks in the conventional manner. In this regard, the conventional manner is by signaling between a mobile terminal and a conventional base station (macro base station) that has a dedicated connection to a Mobile Switching Centre (MSC), and which provides coverage in the cell occupied by the mobile terminal using cellular telecommunication (e.g. GSM, UMTS etc) communication transport protocols. It has been proposed to increase network capacity by providing additional special base stations, referred to as access points (APs), for example at a subscriber's home or office. Many different names have been given to APs, such as home access points (HAPs), micro-base stations, pico-base stations, pico-cells and femto-cells, but all names refer to the same apparatus. APs provide short range, localized cellular telecommunications coverage, and are typically purchased by, or rented to, a subscriber to be installed in their house or business premises.

These APs may be dedicated network access points, or may be enhanced wireless internet hubs (i.e. providing wireless internet access, as well as wireless telecommunications network access). The range of APs is significantly smaller than macro base stations, typically only providing coverage of the order of 20 to 30 meters.

It has also been proposed to use APs in the Long Term Evolution (LTE) telecommunications network currently being developed, but not yet implemented. LTE is likely to be the next network implementation after 3G/UMTS. Overall, the system described herein is applicable to any type of cellular telecommunications system, including GSM, 3G/UMTS, LTE, CDMA2000 and WiMax.

There are several potential advantages of introducing APs in existing telecommunications networks including reducing capacity on macro networks by routing calls through DSL infrastructure, improving indoor coverage by the dedicated APs and, where sufficient numbers of APs are implemented, the power level of the macro coverage could be reduced, due to a lower demand for the macro-base stations and the fact that the signals from the macro-base stations will not need to penetrate into buildings and areas covered by the APs. Power reductions of course result in energy and financial savings, for instance due to less spectrum being required and also less hardware.

A further advantage of using an access point connected to the core network via an IP network is that existing broadband Digital Subscriber Line (DSL) connections can be used to link mobile terminals with the network core without using the capacity of the radio access network or transmission network of a mobile telecommunications network. In other words, the AP is connected to or integrated into a DSL modem/router and uses DSL to backhaul the traffic to the communication network.

A still further advantage is that APs are able to provide mobile network access to areas where there is no macro radio access network coverage. For example, an AP could provide 3G coverage in an area where there is no macro 3G coverage at all, perhaps only macro GSM coverage. The use of APs as an additional or alternative means for accessing the network therefore advantageously increases the network capacity.

Currently, telecommunication network providers sometimes offer subscribers different call tariffs based on their location. For instance, one such service provides subscribers with cheaper tariffs when they use their mobile terminal in their home.

APs provide another opportunity for network providers to offer reduced rates to subscribers. For instance, subscribers may benefit from a different call tariff when using their mobile terminal through an AP acting as a base station. Such a tariff may be described as a "Homezone" tariff.

For all of the above reasons, it is beneficial that networks know where to expect the AP to be located. Typically, on sale or installation of an AP, the customer would be asked to confirm the location at which he will be installing his AP. The AP will then be registered at this location.

APs are expected to be small, light units which are plugged into DSL. Further additional challenges arise in implementing these access points as conventional base stations in view of their potential mobility. Ideally APs are introduced into a telecommunications network and remain fixed at that site. However, there is the possibility that subscribers may decide to relocate their access point for use at a different site. This would be problematic where the subscriber obtains a reduced tariff for using their AP as a base station from their home, as potentially they would be able to also receive the reduced tariff at other locations by relocating the AP. There is therefore the need for determining the location of an AP in order to determine whether or not a reduced tariff is to be used.

A further problem in regard to the mobility of APs is that mobile telecommunication providers are allocated spectrum in specific regions, so it is vital that they are able to identify the location of all their base stations, which includes APs, since APs are functionally equivalent to macro base stations. In fact, proposed regulatory regulations are likely to require telecommunications providers to know the location of all access points in their network. There is therefore also a need to determine the location of an AP before allowing a communication to proceed. Where a femtocell is determined to be outside the licensed area, it is envisaged that the femtocell radio transmitter would be deactivated.

Further reasons for controlling mobility of APs are to enable emergency calls to be routed to an appropriate local emergency call centre. Also, knowledge of location of APs through which calls are made can be useful in police investigations.

In International Application No. PCT/GB2007/004007, published as WO 2008/047140 A1, which is incorporated herein by reference, there is described a means for identifying the location of an access point by checking the DSL ID of the DSL line into which the access point is connected or by checking the CLI of the line into which the access point is connected.

Accordingly, it would be desirable to provide an alternative, or additional, method which can detect if an access point has moved to an unauthorised location.

SUMMARY OF THE INVENTION

Embodiments of the system described herein can detect if an access point has been moved away from its authorised location by looking for suspicious network activity for example using fraud detection engines.

The system described herein takes advantage of the fact that macro base stations are typically located in fixed positions and it is difficult to move a macro cellular base station or spoof its location. When a mobile device communicates through a base station, identification of the mobile device and of the base station (e.g. cell ID) through which it is communicating is available to the network. The network holds a database which includes the geographic locations of its base stations and so it is able to identify the location of the base station through which the mobile device is communicating and, hence, the general location of mobile device (i.e. within the proximity of the base station). Therefore, if a device communicates on a macro base station and then, a short time after, communicates on an access point, the network could make high level identifications of the location of the access point, depending on the time between communications.

In an embodiment of the system described herein, "velocity checks" are performed on the mobility patterns of individual mobiles. For example, if a mobile makes a call from an AP that is supposed to be located in Newbury, and then 10 minutes later that same mobile makes a call from the macro-cellular network in the Dusseldorf area, then the engine could raise an alarm.

Velocity checks have been used for cloning fraud detection by financial institutions and mobile network operators. Financial institutions aim to detect cloned debit and credit cards, through their usage in different areas. For instance, if a card is used in England for a store purchase and an hour later in Singapore for a store purchase, due to the distance between the two locations, the financial institution would realise that two versions of the same card exist, as it would be impossible for the user of the card to have been in both locations within the time frame.

In mobile networks, velocity checks have been performed on call detail records in order to detect cloned mobile terminals/subscriptions. This technique was used in regard to analog phones, which could be cloned. Modern phones, however, can no longer be cloned. In this scenario a fraud engine determined the location of the mobile terminal when it was used, via the cell ID obtained from a call detail record. The cell ID was cross checked against a cell location database. Therefore, if a mobile terminal initiated a call in England and then an hour later in Singapore, a velocity checks would be able to determine that a clone of the mobile terminal existed, as it would be impossible for the same mobile terminal to have been in both locations. In other words, this would indicate that there are two mobile terminals operating with the same identity.

Embodiments of the system described herein use velocity checks in a totally different manner and for a wholly different purpose to these two known approaches. In this regard, the system described herein does not use velocity checks to identify cloning, but rather the movement of an AP from an authorised location. This difference is clearly evident by appreciating that the cloning approach assumes that the nodes from which movement is assessed are fixed: in the system described herein on the other hand, mobile terminal movement is being assessed to determine whether the AP node is properly fixed.

Since the AP is an entity that is not intended to be a portable device, the mechanisms are not naturally in place to affirm the location of the AP. It is this difficulty, inter alia, that the embodiments of the system described herein address.

BRIEF DESCRIPTION OF THE DRAWINGS

Embodiments of the system described herein will now be explained in relation to the Figures in which.

DETAILED DESCRIPTION

Figure 1:
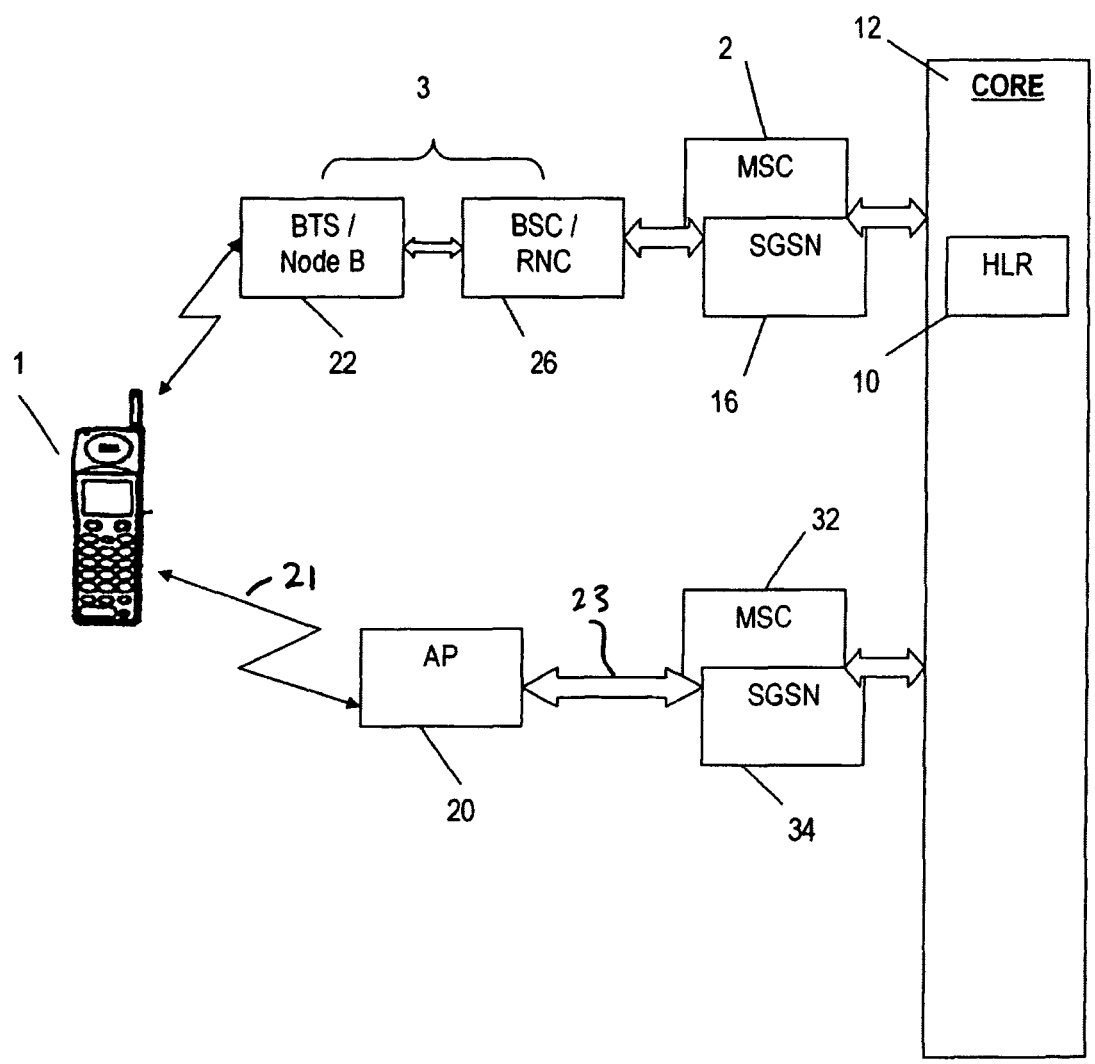
FIG. 1 illustrates an example mobile telecommunications network for receiving IP based communications from an access point in addition to communications from a conventional base station, in which the embodiments of the system described herein may be implemented.

Certain elements of a mobile telecommunications network, and its operation, will now briefly be described with reference to FIG. 1.

Each base station (e.g. base station 3 and AP 20) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal (UE) is shown at 1. The mobile terminal may be a handheld mobile telephone, a personal digital assistance (PDA) or a laptop computer equipped with a datacard.

In a GSM mobile telecommunications network, each base station 3 may comprise a base transceiver station (BTS) 22 and a base station controller (BSC) 26. A BSC may control more than one BTS. The BTSs and BSCs may comprise the radio access network.

In a UMTS mobile telecommunications network, each base station 3 may comprise a node B 22 and a radio network controller (RNC) 26. An RNC may control more than one node B. The node Bs and RNCs may comprise the radio access network.

In the proposed LTE mobile telecommunications network, each base station 3 may comprise an eNode B, which effectively combines the functionality of the node B and the RNC of the UMTS network.

Conventionally, in a GSM/UMTS network, the base stations may be arranged in groups and each group of base stations may be controlled by a mobile switching centre (MSC) 2 and an SGSN (Serving GPRS Support Node) 16. MSC 2 supports communications in the circuit switched domain—typically voice calls, and corresponding SGSN 16 supports communications in the packet switched domain—such as GPRS data transmissions. SGSN 16 functions in an analogous way to MSC 2. The base station 3 may have a dedicated (not shared) connection to its MSC 2, typically a cable connection. This prevents transmission speeds being reduced due to congestion caused by other traffic.

In the LTE network, it is proposed that the base stations may be arranged in groups and each group of base stations may be controlled by a Mobility Management Entity (MME) and a User Plane Entity (UPE).

The radio link 21 from the AP 20 to the mobile terminal 1 may use the same cellular telecommunication transport protocols as the conventional base station 3 but with a smaller range—for example 25 m. The AP 20 may appear to the mobile terminal 1 as a conventional base station, and no modification to the mobile terminal 1 may be required to operate with the AP 20. The AP 20 may perform a role corresponding to that of macro base station 3.

Communications between the access point 20 and the core network 12 may preferably be IP based communications, and may be, for example, transmitted over a broadband IP network (and routed via the Internet). The communications may be routed via MSC 32 or SGSN 34. The access point 20 may convert the cellular telecommunications transport protocols used between the mobile terminal 1 and the AP 20 to IP based signaling.

The connection 23 between the access point 20 and the core network 12 may use the PSTN telephone network. Typically a DSL cable connects the access point 20 to the PSTN network. The data may be transmitted between the access point 20 and the core network 12 by IP transport/DSL transport. The bandwidth of the cable connection between the access point and the telephone exchange may be shared with multiple other users (typically between 20 and 50 other users).

The access point 20 may be connected to the core network 12 by means other than a DSL cable and the PSTN network. For example, the access point 20 may be connected to the core network 12 by a dedicated cable connection that is independent of the PSTN, or by a satellite connection between the access point 20 and the network core 12.

The AP 20 would typically be configured to serve a Wireless Local Area Network (WLAN) located in a home or office, in addition to GSM/UMTS/LTE networks. The WLAN could belong to the subscriber of the mobile terminal 1, or be an independently operated WLAN. The owner of AP 20 can prescribe whether the AP is either open or closed, whereby an open AP is able to carry communications from any mobile device in the GSM/UMTS/LTE network, and a closed AP is only able to carry communications from specific pre-designated mobile devices.

With this background in mind, implementations of embodiments of the system described herein will now be described, which seek to identify movement of APs from an authorised connection point.

With respect to detection of unauthorised AP movements, a movement analysis engine may be utilised. This engine may analyse a mobile terminal's network usage in order to identify a likely occurrence of unauthorised movement of an AP. The engine may be connected to the telecommunications network, for example as a component of the core network 12, or it may be remote or extant therefrom. Similarly the engine may be fed data in real-time, or it may analyse batches of data provided to it, when required. In this regard, the following embodiments are identified:

1) Engine Performs Analysis Based on Call Detail Records Only

Call detail records may typically be produced by the charging system of the telephone network, and include data such as the calling number, the called number and the date, time and duration of the call. Currently call detail records may indicate a call through an AP by identifying a tariff code associated with the AP, such as a "homezone" tariff code. A "homezone" tariff provides subscribers with preferential mobile rates when using their home-based AP. Thus, only calls made by such subscribers through their AP will include the tariff code, which can then be used by the engine to identify the AP and detect unauthorised AP movements. In proposed architectures, a network module may check the subscriber details and AP details and checks its records to determine whether that AP is registered to that particular subscriber. If the subscriber is registered to that AP and the subscriber is entitled to a different charging rate through the AP, the module flags the call with an appropriate tariff code.

Since this approach only uses the call detail records which indicate whether the call attracted a preferential tariff, there is no information about where the AP is located and so in-country movements may not be detectable in this embodiment. However, it is still possible to detect movements of the AP to another country. In this regard, the movement analysis engine, upon noting a tariff code associated with an AP, may also check whether the call record shows that the AP is not located its home country, typically by checking the serving network ID and/or location of the cell though which the call took place. In other words, where the cell ID and/or serving network ID relate to another country, there is a high probability that the AP has been moved.

To take into consideration the fact that legitimate APs may be near the boundary with another country, to help increase accuracy in such circumstances, the velocity check may exclude certain cell IDs known to provide coverage along international borders.

It is however to be appreciated that, in this embodiment of the system described herein, calls made from an AP by guests that are charged at the normal macro-cell network rate may not be used since their calls will not be flagged as chargeable on the AP tariff and so the records do not provide evidence that the call was made through an AP.

As an alternative to identifying the AP from the unique tariff code, it is also envisaged that an AP could be identified from its own cell ID, where a list of cell IDs that correspond to APs is compiled. In this regard, when the movement analysis engine identifies a cell ID in the call detail records that corresponds to a cell ID in its AP Cell ID list, the engine may then check the serving network ID to determine whether or not the AP is in its home country.

2) Engine Performs Analysis Based on AP Location Information

As with the first embodiment, the AP may be identified from the call detail records, such as by identifying calls made with a tariff unique to APs, or by cross checking the cell ID with a list of cell IDs corresponding to APs.

This second embodiment may be used to detect unauthorised in-country movements since information relating to the AP's expected home location is known. In this regard, in this embodiment of the system described herein a velocity check may be performed, whereby, when a call made from an AP by a particular mobile terminal is detected (e.g. from a call detail record), a subsequent or previous call made by that same mobile terminal via a macro-cell is determined and the time and position of that macro-cell call compared with the AP's expected home location and logged AP call time. Where the distance between the AP's expected location and the macro-cell could reasonably be travelled in the time between the calls at the two locations, the AP is considered to be at its expected location.

Figure 2:
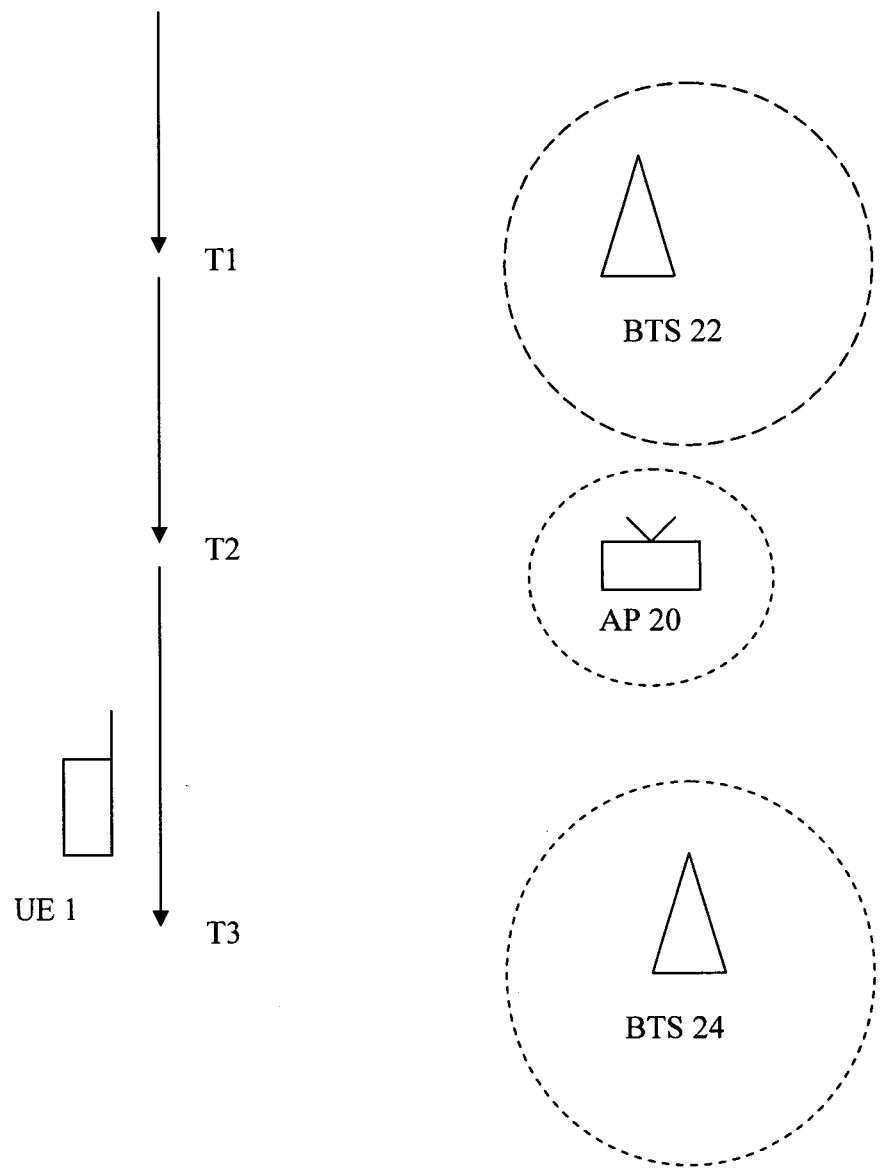
FIG. 2 provides a schematic diagram illustrating the movement of a mobile terminal through a telecommunications system including an AP and a plurality of macro base stations useful in explaining embodiments of the system described herein.
Figure 3:
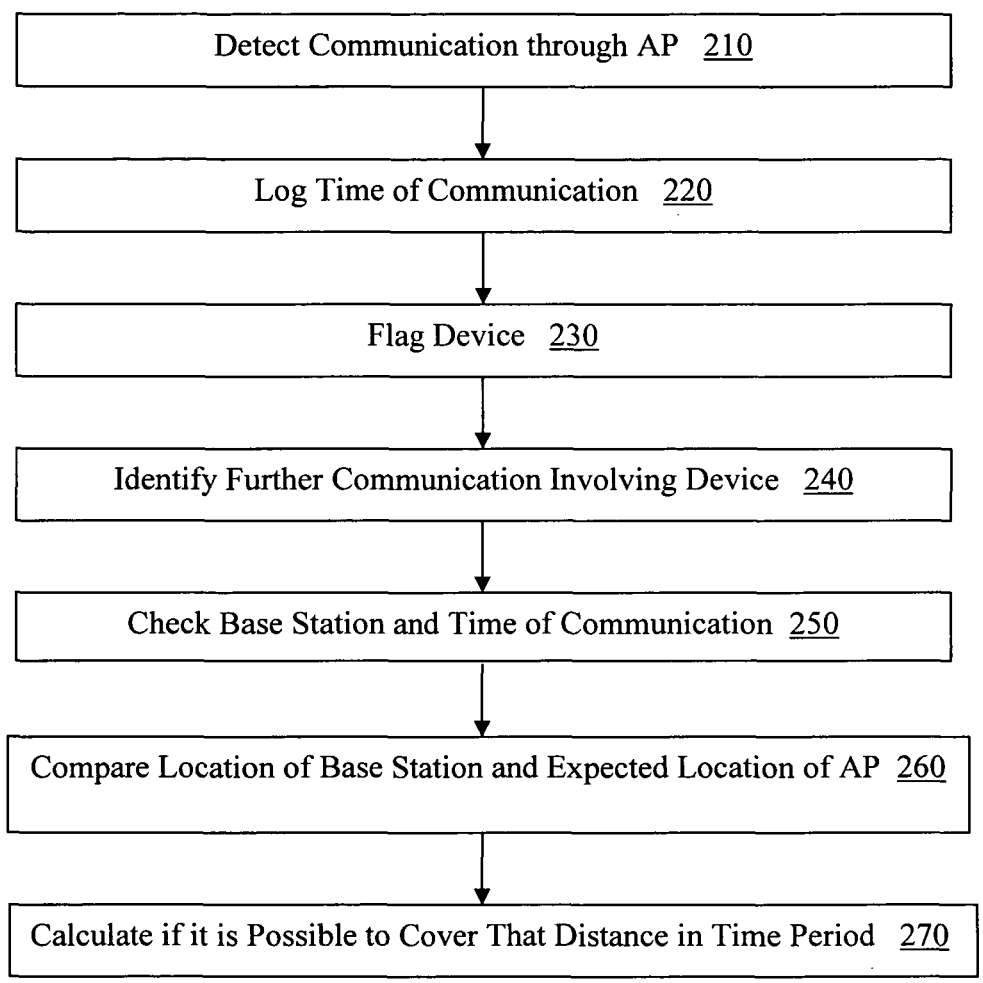
FIG. 3 illustrates a flow chart illustrating the operation of a movement analysis engine according to an embodiment of the system described herein.

A more detailed example of a velocity check procedure that may be used is described in relation to FIGS. 2 and 3. FIG. 2 shows the movement of a mobile device (UE 1) between locations served by different macro base stations (BTS 22, BTS 24) and an access point (AP 20). At time T1 the mobile device may be in a cell served by BTS 22. While it communicates via BTS 22, the communication signals from the device to the network may carry an identification of BTS 22 in terms of BTS1's cell ID. At time T2 the device may be located in the cell served by AP 20. Again, identification of AP 20 may be attached to any communications from the device at the access point as the communications are routed to the core network. Finally, at T3 the mobile device has moved so that it is located in the cell served by BTS 24. BTS 24 may attach its cell ID to any communications from the device UE 1 to the network.

The velocity check may be performed in relation to AP 20 using separate communications by the mobile device through AP 20 and one or more of BTS 22 and BTS 24. In this regard the actual relative location of the cells is irrelevant, so the cells may be located adjacently or be large distances apart.

Alternatively, the velocity check may be performed in relation to AP 20 using a single communication, where the device UE 1 is moving from BTS 22, AP 20 and then on to BTS 24.

The location of the calls on the macro-cell network through BTS 22 and BTS 24 may be determined based on serving network ID (i.e. to detect calls made on foreign networks) and/or cell ID (e.g. for calls made on the home network). The movement analysis engine may then use geographical information associated with the network/cell IDs to determine the location of the calls, and the times of the calls to check how fast the mobile has moved between locations. If the velocity between the femto-cell and the macro-network is above a certain threshold, then an alarm may be raised to indicate suspicion that the femto-cell has been moved. Alternatively, or in addition, access may thereafter be barred to the femto-cell from its determined location.

FIG. 3 is a flow diagram identifying the steps taken in an embodiment of the system described herein, from a network point of view, where UE 1 moves from AP 20 to BTS 24. At a step 210 the network may detects that the device is involved in a communication through access point 20. At a step 220 the time of the communication (T2) is logged and stored in a database of the mobile communication network. The device may then be flagged at a step 230 for the network to check its next communication.

At a step 240 the device is engaged in a further communication. The network identifies the BTS 24 through which the device is communicating at a step 250.

At a step 260 the network compares the location of the BTS 24 and the expected location of the AP 20 as stored in its register database and calculates the time between the communications (i.e. T3–T2). At a step 270, the network then calculates whether it is possible for the device to travel the distance between the BTS 24 and the expected location of AP 20 in the given time.

In calculating whether it is possible for UE 1 to travel the distance in the given time, approximations on the speed necessary for covering the distance are made. If the speed is feasible, such as within the normal limits of road traffic speeds, then the AP will be considered to be in its expected position.

If the network engine determines that the movement between the two locations by the UE is outside the bounds of possibility, then it is likely that the AP may be being used in an unregistered location and it can take action against the access point, such as by barring its network access. The network operator can take different actions depending on the strength of evidence, for example different levels of warning could be given to the AP owner prior to blocking service. The network operator may also apply a different tariff, or a penalty fee, where movement of the AP is detected or suspected.

In certain embodiments, in determining the feasibility of the UE's speed, the network may have access to flight or other transport timetables in order to identify whether the movement between the two locations by the UE is possible in the given time and at that time. In such embodiments, if the system detects a large geographical movement within a particular time period it could consult travel timetables for the relevant time period to determine whether it was possible to travel between the locations during that time period.

Embodiments of the system described herein are required to make assumptions or calculations of the distance travelled by mobile devices between communications with different base stations and APs in order to avoid making incorrect assessments on the location of the AP.

In an alternative embodiment, locations and timing of communications made before the device called through the AP can be utilised (e.g. communications through BTS 22 at time T1), rather than such communications after the occurrence of a communication through the AP. Such information may be found in a database of existing call detail records.

Overall the embodiments of the system described herein utilising this form of velocity checking are using a known technique, but rather than determining an instance of object cloning (e.g. of a credit card or mobile handset) through the movement of that object, the extent of movement of a mobile handset is used to determine the validity of a location of a fixed Access Point. In this way, these embodiments of the system described herein make use of a known technique in unique and novel manner.

3) Engine Performs Analysis Based on Information from AP System

This embodiment uses information sent by the AP in communications through it in order to identify the AP. For instance, a field may be added to the cell_ID that distinguishes APs from macro-base stations. In such embodiments, any call routed through the AP will be tagged with an identification of the AP, for example using the cell ID of the AP. Thus, call records will show that a particular call was routed through that specific AP. This embodiment of the system described herein can therefore also make use of calls made by AP guests that are charged at normal macro-cell network rates.

This technique of identifying the AP may be used in addition to identifying the AP using the call detail records, or as a separate technique. Once the AP is identified, velocity checking would be performed using an approach as described above.

4) Engine Performs Analysis Based on Signalling Feed

This embodiment makes use of the signaling feed from mobile terminals, so that it is not necessary for a call to be made through a UE for location detection to be initiated. For example, signaling from or to idle UEs can be used, such as when the UE performing a location update through an AP.

In this regard, once the network sees the location update with the cell ID identifying an AP, the network can then investigate the macro base-stations through which the mobile device signaled before and/or after the AP signaling in order to identify whether the AP is in its expected location. The network would expect that any change in location of a device during a location update will show the device moving to a cell or tracking area adjacent to that in which the device was previously located. If the location update shows the device moving into the AP from a cell or tracking area which is a sufficient distance from the expected location of the AP, the network could conclude that the device is not in its expected location. Alternatively, if the device updates its location when moving from the AP into a macro cell or tracking area which is a sufficient distance from the expected location of the AP, the network could conclude that the AP is not in its expected location. Advantageously this embodiment can make use of information about the movements of mobiles in and out of APs even if they do not make calls when attached to the AP.

There are many advantages provided by these embodiments of the system described herein. For instance, the engine is generally able to check the location of base stations with which a mobile device has communicated within a reasonably short time period. Further, the velocity checking system has little impact on the AP system itself, as the cell ID, location of the macro cells and registered location of the AP are compared within the core network. Overall, the embodiments are able to provide a good backup mechanism if preventative methods against movement of the AP are circumvented.

If a network detects that an AP has been moved from a registered location it may block the AP from being used. Networks could execute this AP blocking by, for example, identifying communications through the AP from the APID included in the communication and terminating or not connecting those communications.

In all of these embodiments, there is a risk of false positive movement identifications (and false negatives). The embodiments are therefore to be considered as providing an indication of a likelihood of movement, and further analysis may be required to verify whether or not actual movement has occurred.

Further, the movement analysis engine preferably performs its analysis in real time, but this is not always possible, so there is likely to be a time lag in detection, especially if the engine relies of call detail records from roamed to networks.

The embodiments of the system described herein may be used in conjunction with preventative methods for stopping unauthorised movement of APs. As discussed above, there are important reasons for wanting to prevent movement of the AP including network planning, emergency routing and spectrum issues. The system described herein may also be used in conjunction with additional fraud detection capabilities in order to further minimise the risk of APs being used in unauthorised locations.

The embodiments of the system described herein have mainly described in relation to calls originating from an AP, however, they may equally apply to calls terminating at an AP. The embodiments of the system described herein may be implemented separately or in appropriate combination with one other.

The system described herein may include a computer having at least one processor that performs any of the above-noted steps. The system may further include a display and/or other computer components for providing a suitable interface for a user and/or with other computers. A computer-readable storage medium may be provided storing executable code that is executable by least one processor for carrying out any of the steps and processes described herein. The system may include the computer-readable storage medium having the executable code stored thereon. Computer-readable storage mediums may include RAM, ROM, hard disks, compact disks, portable flash drives and/or other types of tangible memory or media that may be read by a computer.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. In a telecommunications system including at least one macro base station and at least one micro base station, each for wirelessly communicating with mobile terminals, a method of identifying movement of a particular micro base station from an expected location comprising:
   identifying a first communication of a given mobile terminal through the particular micro base station at a first point in time;
   identifying a first location relating to the first communication;
   identifying a second communication of the given mobile terminal through a first macro base station at a second point in time;
   identifying a second location relating to the second communication;
   performing a velocity check for the given mobile terminal between the first point in time and the second point in time using the first and second locations, wherein the velocity check includes calculating a speed or velocity result for the given mobile terminal from a distance between the particular micro base station and the first macro base station, determined using the first location and the second location, and a time period between the first and second points in time;
   comparing the calculated speed or velocity result with a speed or velocity threshold; and
   using a result of the velocity check relating to the given mobile terminal to determine whether the particular micro base station is located at the expected location, wherein, when the particular micro base station is not located at the expected location, the particular micro base station is determined as being at an unauthorized location.

2. The method of claim 1, wherein the particular micro base station is determined to be at the expected location when the result is at or below the threshold.

3. The method of claim 1, wherein the particular micro base station is determined as having moved from the expected location when the result exceeds the threshold.

4. The method of claim 1, wherein the first position relating to the particular micro base station is the expected location of the micro base station.

5. The method of claim 1, wherein the expected location of the micro base station is the location to which the micro base station is registered with a network.

6. The method of claim 1, wherein the second communication is a communication preceding the first communication.

7. The method of claim 1, wherein the first communication is a communication preceding the second communication.

8. The method of claim 1, wherein the first micro base station is identified in the first communication from a Cell ID which includes a field identifying micro base stations.

9. The method of claim 1, wherein the particular micro base station is identified in the first communication from a tariff code in a call detail record.

10. A network analysis engine configured for use in a telecommunications system, the telecommunications system including at least one macro base station and at least one micro base station, each for wirelessly communicating with mobile terminals, the network analysis engine comprising:
   a first communication identifier for identifying a first communication through a particular micro base station relating to a given mobile terminal;
   a first time identifier for identifying a first point in time relating to the first communication;
   a first location identifier for identifying a first location relating to the first communication;
   a second communication identifier for identifying a second communication relating to the given mobile terminal through a first macro base station;
   a second time identifier for identifying a second point in time relating to the second communication; and
   a second location identifier for identifying a second location relating to the second communication;
   an analyzer configured to:

use the first and second locations and the first and second points in time to perform a velocity check for the given mobile terminal between the first and second points in time; and use a result of the velocity check relating to the given mobile terminal to determine whether the particular micro base station is located at an expected location, wherein, when the particular micro base station is not located at the expected location, the particular micro base station is determined as being at an unauthorized location, wherein the velocity check, that the analyzer is configured to perform, includes calculating a speed or velocity result for the given mobile terminal from a distance between the particular micro base station and the first macro base station, determined using the first location and the second location, and a time period between the first and second points in time; and a comparing device for comparing the calculated speed or velocity with a speed or velocity threshold.

11. The network analysis engine of claim 10, wherein the particular micro base station is determined to be at the expected location when the result is at or below the threshold.

12. The network analysis engine of claim 10, wherein the particular micro base station is determined as having moved from the expected location when the result exceeds the threshold.

13. The network analysis engine of claim 10, wherein the first position relating to the micro base station is the expected location of the micro base station.

14. The network analysis engine of claim 10, wherein the expected location of the micro base station is the location to which the micro base station is registered with a network.

15. The network analysis engine of claim 10, wherein the second communication is a communication preceding the first communication.

16. The network analysis engine of claim 10, wherein the first communication is a communication preceding the second communication.

17. The network analysis engine of claim 10, wherein the first micro base station is identified in the first communication from a Cell ID which includes a field identifying micro base stations.

18. The network analysis engine of claim 10, wherein the particular micro base station is identified in the first communication from a tariff code in a call detail record.

* * * * *